United States Patent
Hosp

(10) Patent No.: US 10,984,396 B2
(45) Date of Patent: Apr. 20, 2021

(54) METHOD AND SYSTEM FOR DISTRIBUTION OF DATA INSIGHTS

(71) Applicant: Mastercard International Incorporated, Purchase, NY (US)

(72) Inventor: Adam Kenneth Hosp, Lake St. Louis, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 788 days.

(21) Appl. No.: 15/480,545

(22) Filed: Apr. 6, 2017

(65) Prior Publication Data

US 2018/0293558 A1     Oct. 11, 2018

(51) Int. Cl.
*G06Q 40/00*     (2012.01)
*G06Q 20/10*     (2012.01)
(Continued)

(52) U.S. Cl.
CPC ......... *G06Q 20/10* (2013.01); *G06F 16/9535* (2019.01); *G06Q 30/016* (2013.01);
(Continued)

(58) Field of Classification Search
CPC .............. H04L 2209/38; H04L 9/3247; H04L 2209/56; H04L 9/0637; H04L 63/10; H04L 63/0807; H04L 9/30; H04L 9/3213; H04L 63/08; H04L 9/0643; H04L 63/0815; H04L 63/083; H04L 63/0861; H04L 67/10; H04L 9/14; H04L 61/1511; H04L 63/0435; H04L 63/0442; H04L 63/06; H04L 63/0823;
(Continued)

(56) References Cited

U.S. PATENT DOCUMENTS 6,748,367 B1     6/2004 Lee
2009/0327133 A1*  12/2009 Aharoni ................. G06Q 20/10
                                                              705/44
(Continued)

OTHER PUBLICATIONS

Now, you can send money through a social network,Businessline; Chennai [Chennai]Aug. 13, 2014. (Year: 2014).*
(Continued)

*Primary Examiner* — Lalita M Hamilton
(74) *Attorney, Agent, or Firm* — Buchanan Ingersoll & Rooney PC

(57) ABSTRACT

A method for providing data values to an automated program includes: storing, in an account database, a plurality of account profiles, wherein each account profile includes at least an account identifier and a digital token value related to a user account; executing, by a querying module, a query on the account database to identify a specific account profile; transmitting, by a transmitting device, the digital token value included in the specific account profile to a first computing system; receiving, by a receiving device, a plurality of data values associated with a user corresponding to the user account related to the specific account profile based on the digital token value from the first computing system; and transmitting, by the transmitting device, one or more data values of the plurality of data values to an automated application program executed by a second computing system.

20 Claims, 6 Drawing Sheets

(51) Int. Cl.
  *H04L 29/08* (2006.01)
  *G06F 16/9535* (2019.01)
  *G06Q 30/00* (2012.01)
  *G06Q 30/02* (2012.01)
  *G06Q 50/00* (2012.01)

(52) U.S. Cl.
  CPC ......... *G06Q 30/0282* (2013.01); *G06Q 50/01* (2013.01); *H04L 67/306* (2013.01); *H04L 67/10* (2013.01); *H04L 67/34* (2013.01)

(58) Field of Classification Search
  CPC ............ H04L 63/0853; H04L 63/0876; H04L 63/105; H04L 67/18; H04L 9/3236; H04L 2463/101; H04L 41/12; H04L 61/2007; H04L 63/0428; H04L 63/062; H04L 63/0884; H04L 63/102; H04L 63/123; H04L 67/02; H04L 67/1097; H04L 67/141; H04L 9/0825; H04L 9/3226; H04L 9/3297; H04L 12/1446; H04L 12/1453; H04L 12/1467; H04L 12/1822; H04L 12/2816; H04L 12/66; H04L 2209/046; H04L 2209/60; H04L 2209/80; H04L 2209/805; H04L 29/06027; H04L 29/06965; H04L 29/08; H04L 29/08333; H04L 29/12066; H04L 29/1216; H04L 41/0803; H04L 41/0816; H04L 41/0836; H04L 41/0866; H04L 43/10; H04L 43/50; H04L 45/02; H04L 61/106; H04L 61/157; H04L 61/1582; H04L 61/6059; H04L 61/609; H04L 63/0272; H04L 63/0281; H04L 63/0421; H04L 63/108; H04L 63/1433; H04L 63/1441; H04L 63/162; H04L 63/166; H04L 63/20; H04L 65/1006; H04L 65/1069; H04L 65/403; H04L 65/4038; H04L 65/4069; H04L 65/60; H04L 65/601; H04L 67/104; H04L 67/1046; H04L 67/125; H04L 67/148; H04L 67/2814; H04L 67/306; H04L 67/32; H04L 67/327; H04L 67/34; H04L 67/42; H04L 69/28; H04L 69/326; H04L 69/40; H04L 9/006; H04L 9/0625; H04L 9/08; H04L 9/0819; H04L 9/083; H04L 9/0841; H04L 9/0861; H04L 9/0869; H04L 9/0894; H04L 9/32; H04L 9/321; H04L 9/3231; H04L 9/3239; H04L 9/3242; H04L 9/3263; H04L 9/3271; H04L 16/9535; G06N 20/00; G06N 5/025; G06N 7/005; G06N 5/04; G06N 3/04; G06N 20/20; G06N 3/0454; G06N 3/0472; G06N 3/08; G06N 3/084; G06N 5/003; G06N 5/02; G06N 5/022; G06N 5/043; G06N 5/048; G06N 7/00; G06Q 20/385; G06Q 20/40; G06Q 20/4016; G06Q 20/3674; G06Q 20/10; G06Q 20/12; G06Q 20/32; G06Q 20/382; G06Q 20/401; G06Q 2220/00; G06Q 20/20; G06Q 20/3821; G06Q 20/38215; G06Q 20/4014; G06Q 20/102; G06Q 20/223; G06Q 20/3223; G06Q 20/36; G06Q 20/38; G06Q 20/405; G06Q 20/425; G06Q 30/0226; G06Q 20/227; G06Q 20/3278; G06Q 20/367; G06Q 20/3829; G06Q 20/40145; G06Q 20/42; G06Q 30/0207; G06Q 30/06; G06Q 40/02; G06Q 20/105; G06Q 20/1085; G06Q 20/322; G06Q 20/3224; G06Q 20/3226; G06Q 20/3276; G06Q 20/34; G06Q 20/351; G06Q 20/3572; G06Q 20/3578; G06Q 20/3672; G06Q 20/4018; G06Q 20/409; G06Q 30/016; G06Q 30/02; G06Q 30/0201; G06Q 30/0205; G06Q 30/0238; G06Q 30/0261; G06Q 30/0281; G06Q 50/01; G06Q 10/06; G06Q 10/0637; G06Q 10/067; G06Q 20/00; G06Q 20/02; G06Q 20/04; G06Q 20/042; G06Q 20/0453; G06Q 20/08; G06Q 20/085; G06Q 20/18; G06Q 20/201; G06Q 20/202; G06Q 20/203; G06Q 20/204; G06Q 20/206; G06Q 20/24; G06Q 20/26; G06Q 20/3221; G06Q 20/325; G06Q 20/3255; G06Q 20/327; G06Q 20/3272; G06Q 20/3274; G06Q 20/341; G06Q 20/352; G06Q 20/355; G06Q 20/3552; G06Q 20/356; G06Q 20/35765; G06Q 20/35785; G06Q 20/363; G06Q 20/3825; G06Q 20/3827; G06Q 20/383; G06Q 20/387; G06Q 20/389; G06Q 20/4012; G06Q 20/4093; G06Q 20/4097; G06Q 2220/14; G06Q 30/0185; G06Q 30/0202; G06Q 30/0204; G06Q 30/0215; G06Q 30/0218; G06Q 30/0222; G06Q 30/0224; G06Q 30/0229; G06Q 30/0237; G06Q 30/0248; G06Q 30/0252; G06Q 30/0253; G06Q 30/0254; G06Q 30/0267; G06Q 30/0269; G06Q 30/0279; G06Q 30/0282; G06Q 30/0613; G06Q 30/0631; G06Q 50/12; G06Q 40/00; G06F 16/9535
  See application file for complete search history.

(56) References Cited

U.S. PATENT DOCUMENTS

| | | | | |
|---|---|---|---|---|
| 2012/0101881 | A1* | 4/2012 | Taylor | G06Q 20/12 705/14.13 |
| 2012/0158589 | A1* | 6/2012 | Katzin | G06Q 20/12 705/44 |
| 2016/0117651 | A1* | 4/2016 | Davis | G06Q 20/3255 705/40 |
| 2016/0117659 | A1* | 4/2016 | Bedier | G06Q 20/204 705/16 |
| 2016/0173483 | A1* | 6/2016 | Wong | H04L 63/083 726/9 |
| 2016/0301639 | A1* | 10/2016 | Liu | G06Q 50/01 |
| 2017/0193498 | A1* | 7/2017 | Metral | G06Q 20/36 |
| 2017/0249689 | A1* | 8/2017 | O'Neill | G06Q 10/087 |
| 2018/0183737 | A1* | 6/2018 | Subbarayan | G06Q 20/3223 |

OTHER PUBLICATIONS

International Search Report (Form PCT/ISA/210) and the Written Opinion of the International Searching Authority (Form PCT/ISA/237) dated Jun. 28, 2018, by the European Patent Office in corresponding International Application No. PCT/US2018/021728. (10 pages).

* cited by examiner

METHOD AND SYSTEM FOR DISTRIBUTION OF DATA INSIGHTS

FIELD

The present disclosure relates to the distribution of data insights, specifically the use of digital tokens to identify data values associated with a user account for filtering and transmission to an automated application program for the providing of user services thereto.

BACKGROUND

Entities, particularly those selling goods or services, are always looking for new ways to reach their consumers. In many cases, providing specialized customer service to a customer can lead to a more positive interaction, which may be beneficial for the ongoing relationship between entity and customer. However, many times an entity's number of potential customers may greatly outnumber the personnel available to the entity to provide customer service. In such cases, entities have often begun to use automated application programs, often referred to as "bots," to interact with customers and provide customer service functions thereto.

However, many entities lack a suitable platform for interacting with a customer and using an automated application program. In such cases, an entity can often engage with a third party that offers a platform on which the entity can engage the customer using their automated application program. For example, social networks often provide a conversational interface where a customer service bot for an entity can conduct a digital conversation with a user, to provide service to the user on behalf of the entity. Such systems can assist entities with connecting customers to their automated application program, without the need for the entity to directly develop or manage their own platform.

Unfortunately for these entities, such platforms often lack the ability for the entity to provide more personalized service with the customer. For example, the customer may be a long-time customer of the entity, but such information may be unknown to the automated application program, due to the customer interacting therewith via the third party platform. As such, a third party platform may be interested in obtaining additional information about a user, to provide such assistance to the entity. However, current solutions require the platform to independently gather data directly from the user, which may be inaccurate, time-consuming, and resource-intensive.

Thus, there is a need for a technical solution whereby customer data can be identified and provided from a third party platform to an automated application program for use in providing specialized services to the customer.

SUMMARY

The present disclosure provides a description of systems and methods for providing data values to an automated program. A digital token is used by a digital platform to identify data values that are associated with a user of that platform at a third party, such as a payment transaction processor. The data values may then be filtered to identify only those values suitable for distribution to an outside entity, to provide for privacy protection and to reduce data transmissions. These data values can then be fed into an automated application program, such that the application program can provide specialized services to the user without the need to obtain personalized data directly, without the need for a specially developed platform, and without the user having to sacrifice their own privacy.

A method for providing data values to an automated program includes: storing, in an account database of a processing server, a plurality of account profiles, wherein each account profile includes at least an account identifier and a digital token value related to a user account; executing, by a querying module of the processing server, a query on the account database to identify a specific account profile; electronically transmitting, by a transmitting device of the processing server, the digital token value included in the specific account profile to a first computing system; receiving, by a receiving device of the processing server, a plurality of data values associated with a user corresponding to the user account related to the specific account profile based on the digital token value from the first computing system; and electronically transmitting, by the transmitting device of the processing server, one or more data values of the plurality of data values to an automated application program executed by a second computing system.

A system for providing data values to an automated program includes: an account database of a processing server configured to store a plurality of account profiles, wherein each account profile includes at least an account identifier and a digital token value related to a user account; a querying module of the processing server configured to execute a query on the account database to identify a specific account profile; a transmitting device of the processing server configured to electronically transmit the digital token value included in the specific account profile to a first computing system; and a receiving device of the processing server configured to receive a plurality of data values associated with a user corresponding to the user account related to the specific account profile based on the digital token value from the first computing system, wherein the transmitting device of the processing server is further configured to electronically transmit one or more data values of the plurality of data values to an automated application program executed by a second computing system.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
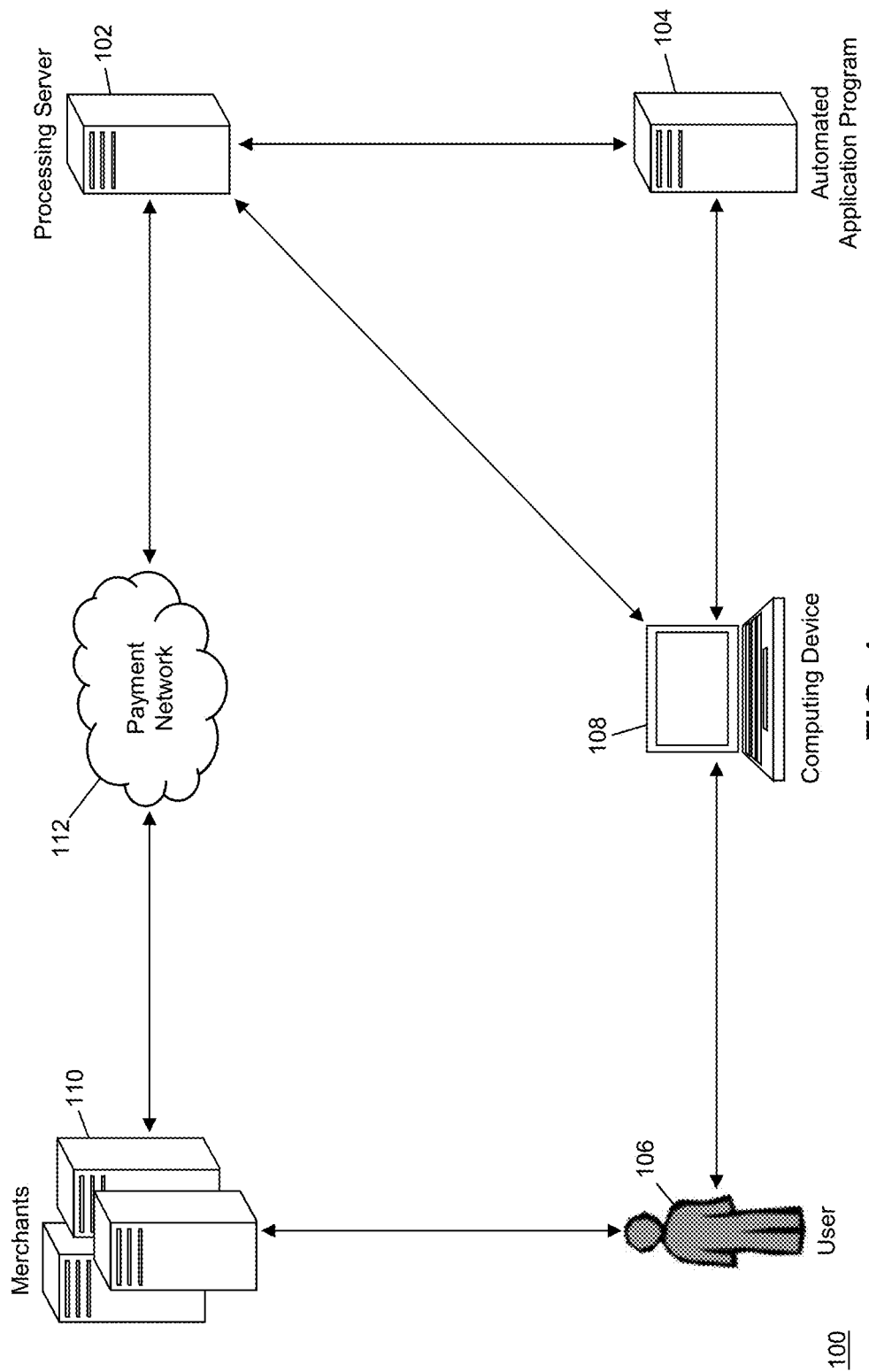
FIG. 1 is a block diagram illustrating a high level system architecture for providing data values to an automated program in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

System for Providing of Data Values to Automated Application Programs

FIG. 1 illustrates a system 100 for the distribution of data values associated with a user account to an automated application program via a specifically configured computing platform.

The system 100 may include a processing server 102. The processing server 102, discussed in more detail below, may be configured to identify data values associated with a user account for delivery to an automated application program 104. The processing server 102 may be a specially configured computing system, illustrated below, that has been configured to perform the functions discussed herein, including the identification and storage of digital token values, identification and filtering of data values, determination of data values and automated application programs, and electronic transmission of data signals to automated application programs. The processing server 102 may be configured to communicate with a user 106 corresponding to a user account for identification thereof, for use in obtaining data values associated with the user 106. Communications between the processing server 102 and the user 106 may be accomplished via a computing device 108 used by the user 106 that is configured to electronically communicate with the processing server 102 using suitable communication networks and methods.

For example, the processing server 102 may operate or be associated with a social network or other digital conversation platform, where the user 106 may have a user account registered therewith. The user 106 may use the computing device 108 to communicate with the processing server 102 (e.g., the social network or other platform) via an application program associated therewith, a web page, or other suitable interface. The user 106 may use the computing device 108 to register their user account with the processing server 102 and opt-in to sharing data values with an automated application program 104. As part of the opting-in, the user 106 may provide (e.g., via the computing device 108), a primary account number corresponding to a transaction account that is associated with the user 106. The transaction account may be a transaction account used by the user 106 to fund payment transactions with a plurality of different merchants 110.

The processing server 102 may receive the primary account number and may provide the primary account number to a payment network 112 in a request for a digital token value. The processing server 102 may communicate with the payment network 112 using any suitable communication network and method, which may include payment rails associated with the payment network 112. The payment network 112 may receive the request that includes the primary account number and may identify a digital token value associated therewith. In some instances, the digital token value may be generated upon receipt of the primary account number, and may be uniquely provided to the processing server 102 (e.g., digital tokens generated on the transaction account distributed to other entities may be different from the digital token value provided to the processing server 102).

The processing server 102 may receive the digital token value and store it in internal or external memory where it may be directly associated with the user account of the user 106. In an exemplary embodiment, the processing server 102 may discard the primary account number. The processing server 102 may thus possess a digital token value that is corresponding to the user's transaction account, but may not be used in payment transactions such that the processing server 102 does not have any access to the transaction account itself.

After the user 106 has been registered and the digital token value received and stored, the processing server 102 may receive a data request from an automated application program 104. The data request may include at least an account identifier associated with the user account of the user 106. The automated application program 104 may communicate with the user 106 and receive the account identifier via the computing device 108. For instance, the automated application program 104 may be a conversational bot (e.g., a "chatbot"), where the user 106 may provide their account identifier to the automated application program 104 via a digital conversation interface. In one such instance, the social network associated with the processing server 102 may provide the digital conversation interface with which the user 106 and automated application program 104 interact. In such cases, the automated application program 104 may submit a data request to the processing server 102, where the processing server 102 may be able to identify the account identifier for the user account based on the access to the digital conversation platform.

The processing server 102 may receive the account identifier and may identify the digital token value that is associated with the user account. The processing server 102 may then electronically transmit the digital token value to the payment network 112. The payment network 112 may identify the transaction account that corresponds to the digital token value and may identify a plurality of data values associated therewith. The data values may include data associated with the user's transaction account and electronic payment transactions funded thereby, such as transactions processed using the payment network 112. Data values may thus include transaction data or data identified therefrom (e.g., by the payment network 112 or a third party entity), such as purchase behaviors. Transaction data may include, for example, transaction amounts, transaction times, transaction dates, geographic locations, merchants, merchant categories, product data, etc. Purchase behaviors may include behaviors of the user 106 and/or transaction account across a plurality of payment transactions according to one or more criteria, such as average spending amount, overall spending amount, transaction frequency, propensity to transact, propensity to spend across one or more categories (e.g., geographic location, merchant, merchant category, product, etc.), or a combination thereof. For example, purchase behaviors may include the user's propensity to spend over $50 on electronics during the next 30 days in each of a plurality of different geographic locations, identified based on the past transactions funded via the transaction account. The payment network 112 may identify these data values for the transaction account, and electronically transmit them to the processing server 102.

In some embodiments, the payment network 112 may electronically transmit all known data values to the processing server 102. In other embodiments, the payment network 112 may selectively identify data values for electronic transmission to the processing server 102 (e.g., may withhold any data values considered personally identifiable of the user 106, such as geographic location data that may locate the user 106). In yet other embodiments, the processing server 102 may request specific data values from the payment network 112. In such embodiments, the specific data values may be identified by the payment network 112, such as may correspond to data values allowed by the user 106 as indicated during the opt-in registration process. In other such embodiments, the automated application program 104 may request the specific data values in the initially submitted data request. In some instances, the processing server 102 may receive data values from the payment network 112 and may be configured to filter the data values. In such instances, the processing server 102 may filter the specific data values from the data received from the payment network 112. For example, the automated application program 104 may request, or the user 106 may only allow use of, specific purchase behaviors. The processing server 102 may thus filter those specific purchase behaviors from the data values returned by the payment network 112.

Once the data values have been received (e.g., and filtered, if applicable), the processing server 102 may electronically transmit the data values to the automated application program 104. The automated application program 104 may then use those data values to provide specialized services to the user 106. For instance, the automated application program 104 may be a conversational bot for a travel agency participating in a digital conversation with the user 106, and may offer, via the digital conversation, a vacation to the user 106 in a location preferred by the user 106 and at a price level acceptable to the user 106 based on their propensities and past travels as identified via their transaction account activity. In such instances, the automated application program 104 may be able to provide better customer service to users 106 via the data values supplied by the processing server 102, without the need to obtain such data directly from the user 106 or a payment network 112. The use of the processing server 102 as an intermediary may ensure that the payment network 112 does not need to interact with a vast number of automated application programs 104 (e.g., which may be resource-intensive, a security threat, etc.), and that automated application programs 104 are never in possession of transaction account information.

In some embodiments, the processing server 102 may be configured to identify an automated application program 104 for communication with the user 106 based on the data values. In such an embodiments, the user 106 may (e.g., via the computing device 108) request a service for which multiple automated application programs 104 correspond. For example, the user 106 may use the social network associated with the processing server 102 and search for a hotel. The processing server 102 may identify all hotels registered therewith that have automated application programs 104. The processing server 102 may obtain the data values for the user 106 from the payment network 112, and may identify a particular automated application program 104 to connect the user 106 to via the social network's digital conversation platform. For instance, in the above example, the processing server 102 may identify a hotel chain preferred by the user 106 based on their past transactions, or may identify a hotel chain that is of the star level preferred by the user 106 and of a price level preferred by the user 106. The processing server 102 may forward appropriate data values to the corresponding automated application program 104, which may then interact with the user 106 via the digital conversation platform. As a result, an ideal combination of the user 106 and automated application program 104 may be identified and matched together, for greater benefit to both users and automated application programs.

In some such embodiments, the payment network 112 may be configured to identify listings of merchants 110 based on user data values. In such cases, the payment network 112 may receive a data request that includes specific data values, and the payment network 112 may identify those data values and identify propensities for the user 106 to interact with specific merchants 110 based thereon. The payment network 112 may then return the merchant 110 having the highest propensity or a listing of merchants 110 in order of propensity. The processing server 102 may then match the user 106 to a corresponding automated application program 104 (e.g., having the highest propensity, or otherwise based on a combination of propensity and other criteria, such as bidding).

Processing Server

Figure 2:
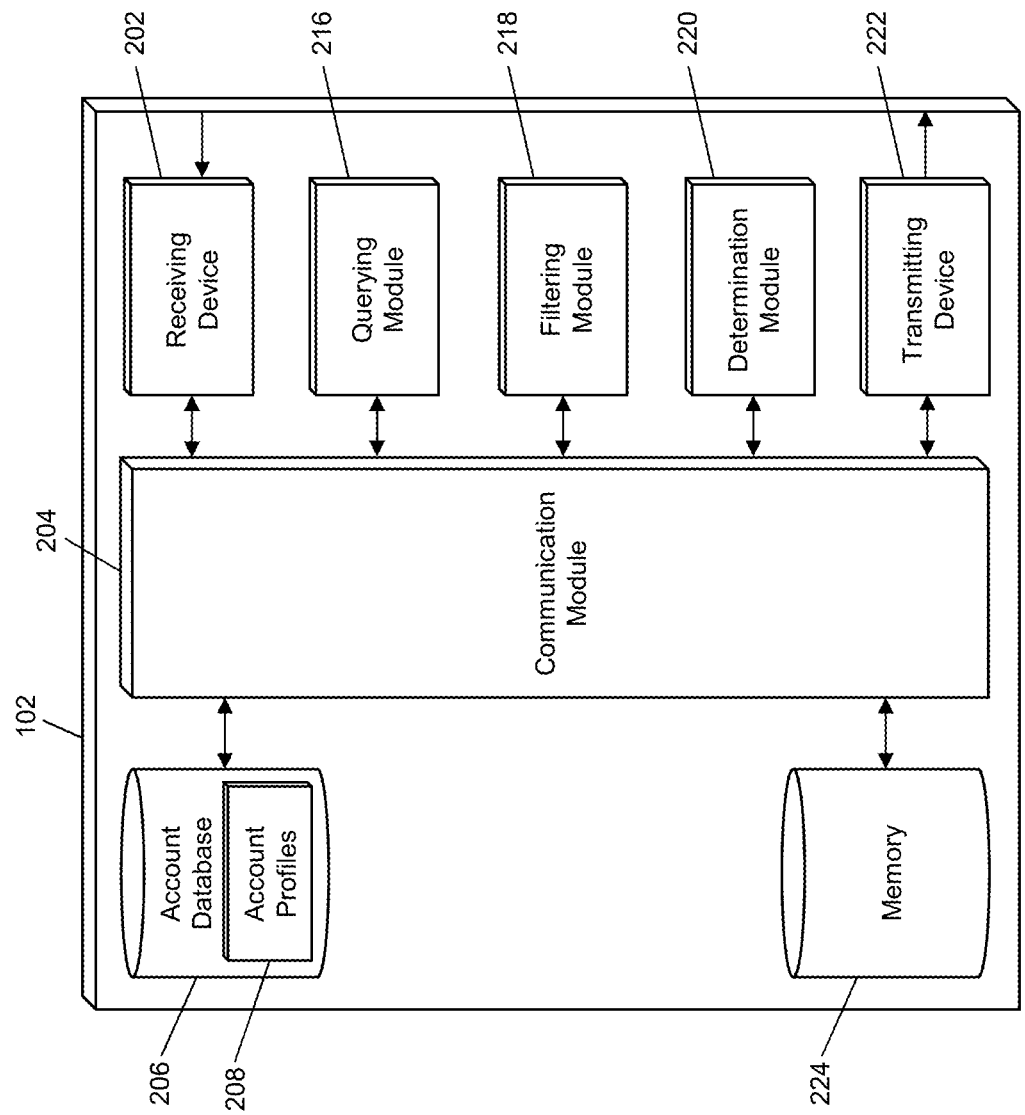
FIG. 2 is a block diagram illustrating the processing server of the system of FIG. 1 for the providing of data values to an automated program in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 600 illustrated in FIG. 6 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from automated application programs 104, computing devices 108, payment networks 112, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by computing devices 108, which may be superimposed or otherwise encoded with user registration data, including an account identifier and a primary account number, and may also include data indicating acceptable data values and/or automated application programs 104. The receiving device 202 may also be configured to receive data signals from payment networks 112 that are superimposed or otherwise encoded with digital token values or data values. The receiving device 202 may be further configured to receive data signals electronically transmitted by automated application programs 104, which may be superimposed or otherwise encoded with data requests, which may include account identifiers and, in some cases, specified data values.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 216, filtering module 218, determination module 220, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include an account database 206. The account database 206 may be configured to store a plurality of account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data related to a user account including at least an account identifier and a digital token value. In some cases, an account profile 208 may also include filtering rules (e.g., which may indicate acceptable data values for sharing with automated application programs 104), user preferences regarding automated application programs 104, and other data, such as contact preferences or communication information.

The processing server 102 may include a querying module 216. The querying module 216 may be configured to execute queries on databases to identify information. The querying module 216 may receive one or more data values or query strings, and may execute a query string based thereon on an indicated database, such as the account database 206, to identify information stored therein. The querying module 216 may then output the identified information to an appropriate engine or module of the processing server 102 as necessary. The querying module 216 may, for example, execute a query on the account database 206 to identify an account profile 208 that includes an account identifier included in a received data request, such as to identify the digital token value stored therein.

The processing server 102 may also include a filtering module 218. The filtering module 218 may be configured to filter data values for use in performing the functions of the processing server 102 as discussed herein. The filtering module 218 may receive instructions as input, may filter data as instructed, and may output the filtered data to another module or engine of the processing server 102. In some cases, the data to be filtered may also be received by the filtering module 218 as input. In other cases, the filtering module 218 may be configured to identify the data to be filtered, such as by instructing the querying module 216 to query memory of the processing server 102 for identification thereof. The filtering module 218 may be configured to filter data values received from the payment network 112 prior to transmission to an automated application program 104, where such filtering may be based on, for example, user preferences (e.g., stored in the account profile 208), the data request of the automated application program 104, user privacy, etc.

The processing server 102 may include a determination module 220. The determination module 220 may be configured to make determinations as part of the functions of the processing server 102 as discussed herein. The determination module 220 may receive instructions as input, may make a determination as instructed, and may output a result of the determination to another module or engine of the processing server 102. For example, the determination module 220 may be configured to determine an automated application program 104 for interacting with the user 106, such as based on user data values received from the payment network 112. For instance, the processing server 102 may use the data values to select an automated application program 104 from a group of automated application programs 104 based thereon.

The processing server 102 may also include a transmitting device 222. The transmitting device 222 may be configured to transmit data over one or more networks via one or more network protocols. In some instances, the transmitting device 222 may be configured to transmit data to automated application programs 104, computing devices 108, payment networks 112, and other entities via one or more communication methods, local area networks, wireless area networks, cellular communication, Bluetooth, radio frequency, the Internet, etc. In some embodiments, the transmitting device 222 may be comprised of multiple devices, such as different transmitting devices for transmitting data over different networks, such as a first transmitting device for transmitting data over a local area network and a second transmitting device for transmitting data via the Internet. The transmitting device 222 may electronically transmit data signals that have data superimposed that may be parsed by a receiving computing device. In some instances, the transmitting device 222 may include one or more modules for superimposing, encoding, or otherwise formatting data into data signals suitable for transmission.

The transmitting device 222 may be configured to electronically transmit data signals to computing devices 108 and automated application programs 104, which may be superimposed or otherwise encoded with account identifiers and any data associated with platforms provided by the processing server 102 (e.g., digital conversation messages for a digital conversation platform operated by the processing server 102). The transmitting device 222 may also be configured to electronically transmit data signals to automated application programs 104 that are superimposed or otherwise encoded with data values received (e.g., and filtered, if applicable) or associated with a user 106. The transmitting device 222 may be further configured to electronically transmit data signals to payment networks 112 that are superimposed or otherwise encoded with a primary account numbers for identification of digital token values or with digital token values for identification of user data values.

The processing server 102 may also include a memory 224. The memory 224 may be configured to store data for use by the processing server 102 in performing the functions discussed herein, such as public and private keys, symmetric keys, etc. The memory 224 may be configured to store data using suitable data formatting methods and schema and may be any suitable type of memory, such as read-only memory, random access memory, etc. The memory 224 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 224 may be comprised of or may otherwise include a relational database that utilizes structured query language for the storage, identification, modifying, updating, accessing, etc. of structured data sets stored therein.

Process for Provisioning of Digital Token Values

Figure 3:
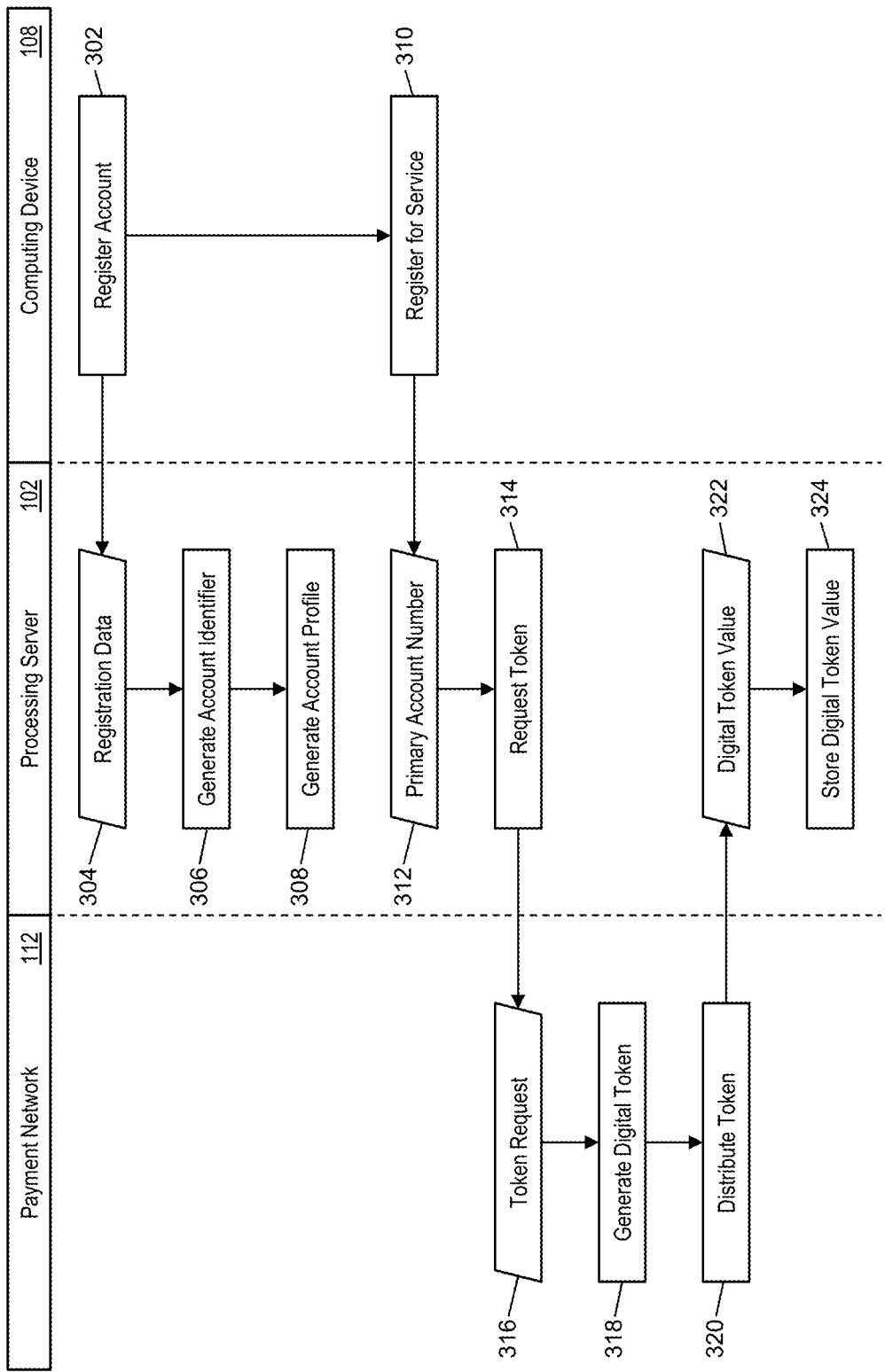
FIG. 3 is a flow diagram illustrating a process for the provisioning of a digital token associated with a user account to the processing server in the system of FIG. 1 in accordance with exemplary embodiments.

FIG. 3 illustrates a process for the provisioning of a digital token value associated with a user account to the processing server 102 by the payment network 112 for use in obtaining data values associated therewith for distribution to automated application programs 104.

In step 302, the computing device 108 operated by the user 106 may register for a user account with the platform operated by the processing server 102. As part of the registration, the computing device 108 may electronically transmit any necessary registration information (e.g., username, e-mail address, password, etc.) to the processing server 102 using a suitable communication network and method. In step 304, the receiving device 202 of the processing server 102 may receive the registration data. In step 306, the processing server 102 may generate an account identifier for the user's user account. The account identifier may be a unique value associated with the user account for identification thereof, such as an identification number, the user's supplied username or e-mail address, a telephone number, media access control address or other data associated with the computing device 108, a registration number, an alphanumeric value, etc. In step 308, the querying module 216 of the processing server 102 may execute a query on the account database 206 to insert a new account profile 208 therein that is related to the user account including at least the registration information and the generated account identifier.

In step 310, the user 106 may, via the computing device 108, register (e.g., opt-in) for the service operated by the processing server 102 for providing data values to automated application programs, such as to enable the user 106 to receive more beneficial, targeted service from merchants 110 and other entities. As part of the registration, the user 106 may supply a primary account number corresponding to a transaction account accessible to the user 106. In step 312, the receiving device 202 of the processing server 102 may receive the primary account number. In step 314, the transmitting device 222 of the processing server 102 may electronically transmit the primary account number to the payment network 112 in a request for a digital token.

In step 316, the payment network 112 may receive the request for a digital token. In step 318, the payment network 112 may generate or otherwise identify a digital token value associated with the transaction account that corresponds to the primary account number included in the request. In step 320, the payment network 112 may electronically transmit the digital token value back to the processing server 102, which may be received by the receiving device 202 of the processing server 102, in step 322. In step 324, the querying module 216 of the processing server 102 may execute a query on the account database 206 to update the account profile 208 related to the user account to include the received digital token value. In an exemplary embodiment, the processing server 102 may discard the primary account number following step 314 or step 322.

Process for Distribution of Data Values

Figure 4:
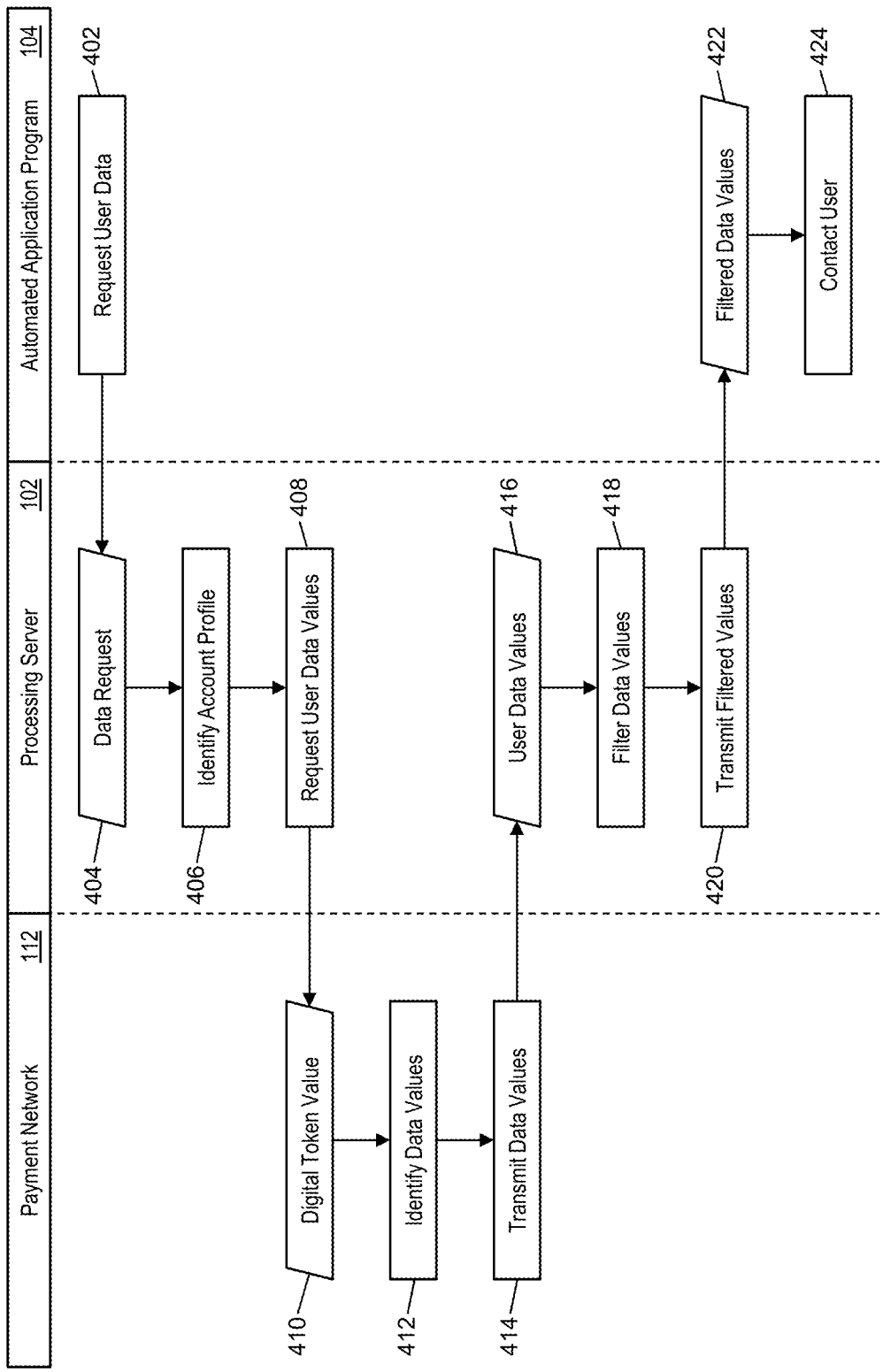
FIG. 4 is a flow diagram illustrating a process for the providing of data values to an automated program in the system of FIG. 1 in accordance with exemplary embodiments.

FIG. 4 illustrates a process for the distribution of filtered data values associated with a user account to an automated application program 104 from a computing platform provided via the processing server 102 in the system 100 of FIG. 1.

In step 402, an automated application program 104 may electronically transmit a request for user data to the processing server 102 via a suitable communication network and method. For instance, the processing server 102 may provide an application programming interface with which the automated application program 104 may request user data. In step 404, the receiving device 202 of the processing server 102 may receive the request for user data, which may include at least an account identifier of the user account associated with the user 106 for which data is being requested. In some embodiments, the request for user data may also specify one or more data values that are being requested.

In step 406, the querying module 216 of the processing server 102 may execute a query on the account database 206 of the processing server 102 to identify an account profile 208 stored therein that includes the account identifier received in the request for user data. In step 408, the transmitting device 222 of the processing server 102 may electronically transmit a request for user data values to the payment network 112. The request for user data values may include at least the digital token value stored in the identified account profile 208. In cases where the automated application program 104 is requesting specific data values, the request for user data values may indicate those specific data values.

In step 410, the payment network 112 may receive the request from the processing server 102 that includes at least the digital token value. In step 412, the payment network 112 may identify a plurality of user data values that are associated with the transaction account that corresponds to the received digital token value, where such data values may be identified based on transaction data for payment transactions involving the transaction account. In some cases, transaction data may be used for both transactions funded by and transactions paid to the transaction account. In instances where the request for user data values indicates specific data values, the payment network 112 may identify only those data values. In step 414, the payment network 112 may electronically transmit the identified user data values to the processing server 102, for receipt by the receiving device 202 thereof, in step 416.

In step 418, the filtering module 218 of the processing server 102 may filter the received user data values, if applicable. The filtering module 218 may filter the user data values to obtain only the user data values specified by the automated application program 104 in the request for user data, or may filter the user data values pursuant to one or more filtering rules, such as rules that specify acceptable data values for the automated application program 104 or rules set by the user 106 for which data is requested (e.g., during their registration process for the service). In step 420, the transmitting device 222 of the processing server 102 may electronically transmit the filtered data values to the automated application program 104, for receipt thereby, in step 422. In step 424, the automated application program 104 may contact the user 106 (e.g., via the platform provided by the processing server 102, a digital conversation platform, or other suitable method) and provide the user with services based on the filtered data values.

Exemplary Method for Providing Data Values to an Automated Program

Figure 5:
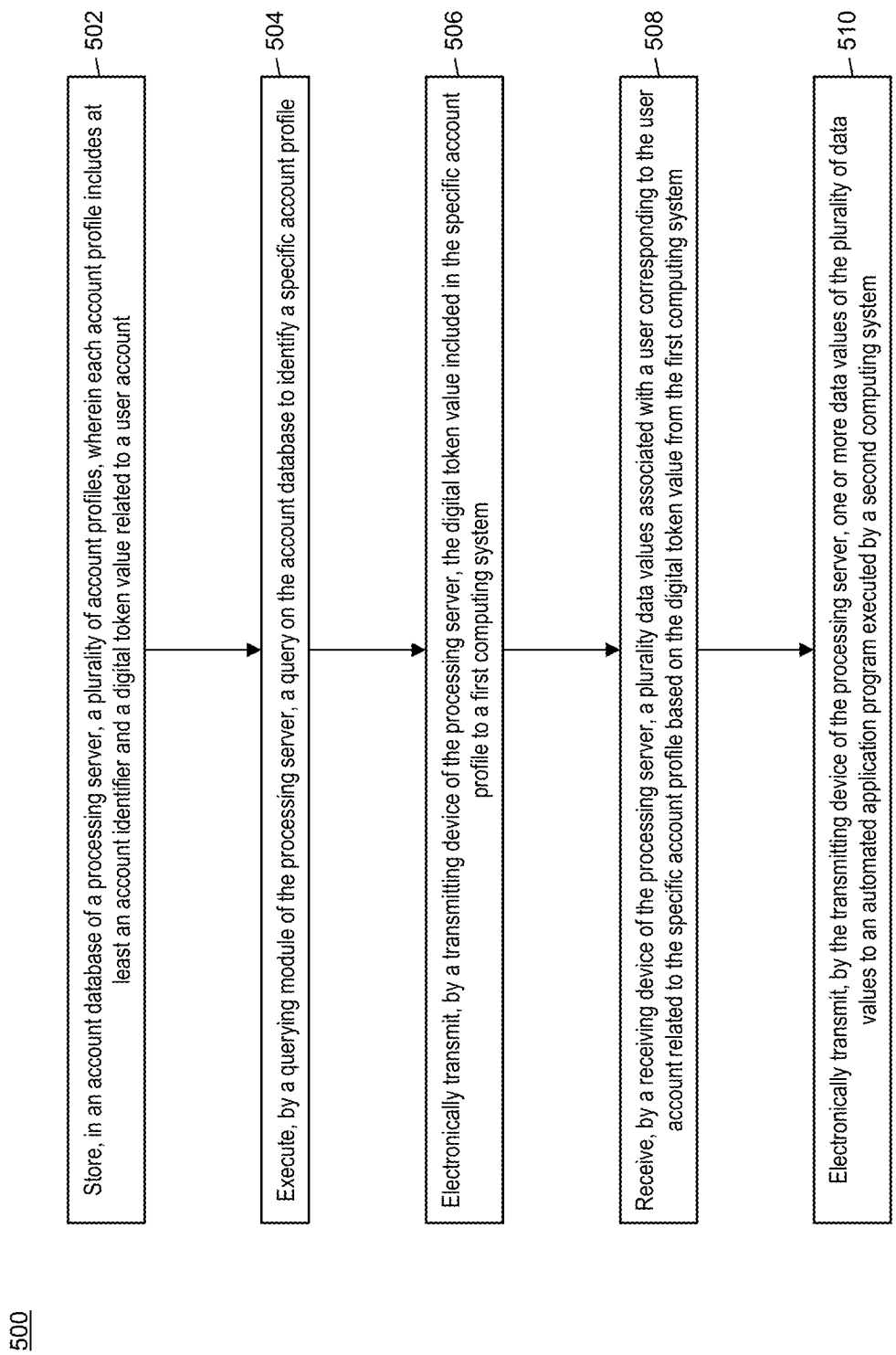
FIG. 5 is a flow chart illustrating an exemplary method for providing data values to an automated program in accordance with exemplary embodiments.

FIG. 5 illustrates a method 500 for the providing of data values associated with a user account to an automated application program via a processing server.

In step 502, a plurality of account profiles (e.g., account profiles 208) may be stored in an account database (e.g., the account database 206) of a processing server (e.g., the processing server 102), wherein each account profile includes at least an account identifier and a digital token value related to a user account. In step 504, a query may be executed on the account database by a querying module (e.g., the querying module 216) of the processing server to identify a specific account profile. In step 506, the digital token value included in the specific account profile may be electronically transmitted by a transmitting device (e.g., the transmitting device 222) of the processing server to a first computing system (e.g., the payment network 112).

In step 508, a plurality of data values may be received by a receiving device (e.g., the receiving device 202) of the processing server, where the data values associated with a user (e.g., the user 106) corresponding to the user account related to the specific account profile based on the digital token value and are received from the first computing system. In step 510, one or more data values of the plurality of data values may be electronically transmitted by the transmitting device of the processing server to an automated application program (e.g., the automated application program 104) executed by a second computing system.

In one embodiment, the method 500 may further include electronically transmitting, by the transmitting device of the processing server, a primary account number associated with a transaction account to the first computing system; and receiving, by the receiving device of the processing server, the digital token value included in the specific account profile, wherein at least one of the plurality of data values includes transaction data associated with the transaction account. In a further embodiment, the method 500 may even further include receiving, by the receiving device of the processing server, the primary account number from a third computing system (e.g., the computing device 108) associated with the user account related to the specific account profile prior to electronically transmitting the primary account number.

In some embodiments, the method 500 may also include filtering, by a filtering module (e.g., the filtering module 218) of the processing server, the plurality of data values to identify the one or more data values. In a further embodiment, the method 500 may further include receiving, by the receiving device of the processing server, a data request from the second computing system, wherein the data request includes one or more desired data types, and the filtering module is configured to filter the plurality of data values based on the one or more desired data types. In an even further embodiment, the data request may be received prior to electronic transmission of the digital token value to the first computing system. In a yet further embodiment, the data request may further include the account identifier included in the specific account profile.

In one embodiment, the method 500 may further include identifying, by a determination module (e.g., the determination module 220) of the processing server, the automated application program of a plurality of automated application programs. In a further embodiment, the automated application program may be identified based on at least one of the plurality of data values. In another further embodiment, the plurality of data values may be accompanied by an indication of the automated application program among the plurality of automated application programs.

Computer System Architecture

Figure 6:
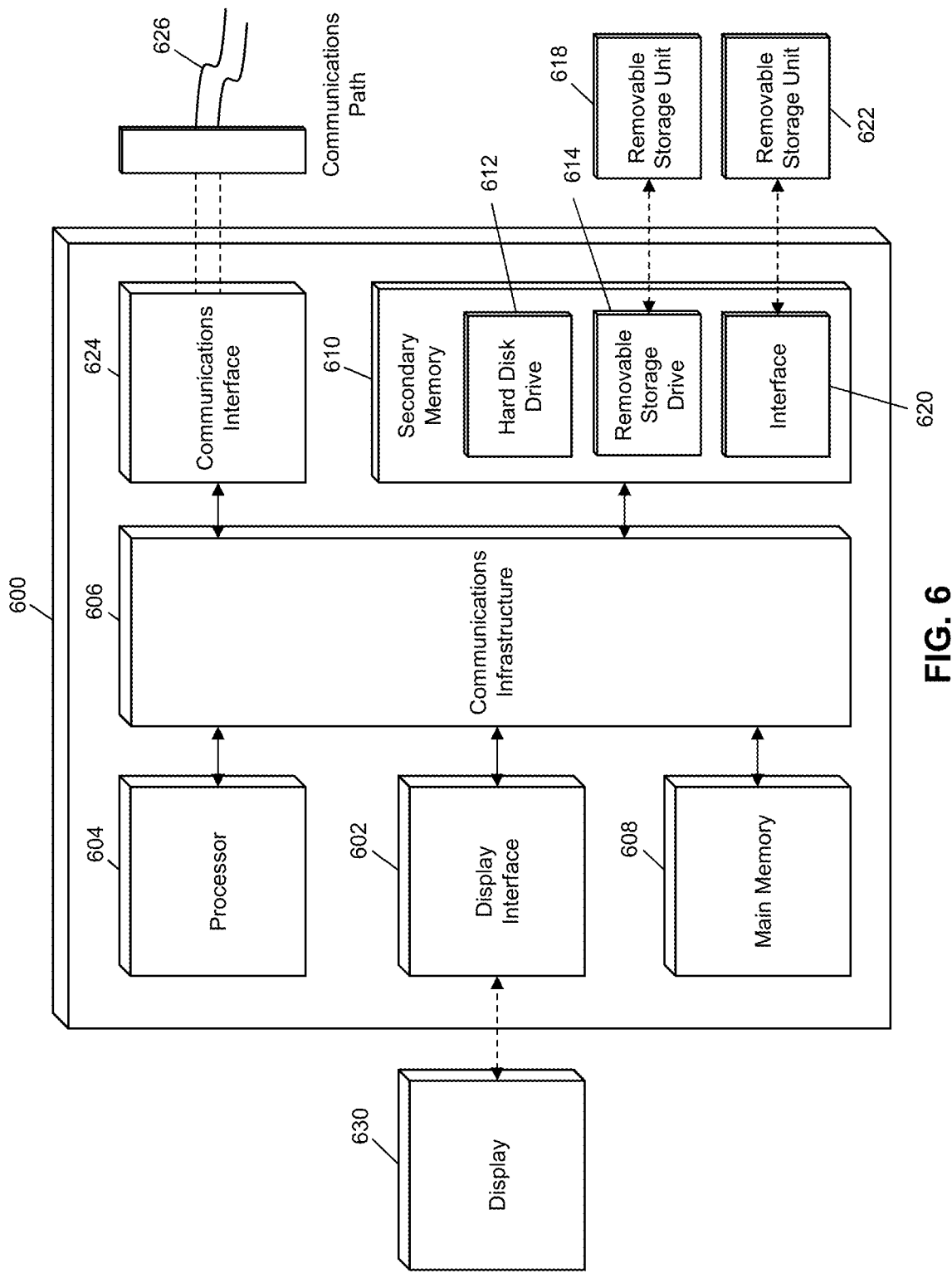
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the processing server 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3-5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for providing data values to an automated program. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for providing data values to an automated program, comprising:

storing, in an account database of a processing server associated with a social network, a plurality of account profiles, wherein each account profile includes at least an account identifier related to a user account;

receiving, by a receiving device of the processing server and from a first computing system via a social network application program, a primary account number associated with a first user account related to a specific account profile;

electronically transmitting, by the transmitting device of the processing server, the primary account number associated with a transaction account to a second computing system;

receiving, by the receiving device of the processing server from the second computer system, a digital token value associated with the transaction account corresponding to the primary account number;

updating, by the processing server, one of the stored account profiles associated with first user account with the received digital token value;

receiving, by the receiving device of the processing server from the first computing system via the social network application program, a request for a service, the request including the primary account number associated with the first user account;

identifying, by the processing server, a plurality of merchants that offer a candidate service corresponding to the requested service and have a bot conversational automatic application program registered with the social network;

executing, by a querying module of the processing server, a query on the account database to identify the specific account profile related to the first user account;

electronically transmitting, by a transmitting device of the processing server, the digital token value included in the specific account profile to the second computing system;

receiving, by a receiving device of the processing server from the second computing system, a plurality of data values associated with a first user corresponding to the first user account related to the specific account profile based on the transmitted digital token value;

identifying, by the processing server, a subset of the identified plurality of merchants based on an increased matching correspondence level between the received plurality of data values and characteristics associated with each of the plurality of merchants, wherein each merchant in the identified subset is respectively associated with a respective one of a subset of the bot conversational automatic application programs registered with the social network; and electronically transmitting, by the transmitting device of the processing server, one or more data values of the plurality of data values to the subset of the bot conversational automatic application programs executing on one or more third computing systems, wherein the subset of the bot conversational automatic application programs provide one or more candidate services corresponding to the service requested by the first user via the social network application program.

2. The method of claim 1, wherein at least one of the plurality of data values includes transaction data associated with the transaction account.

3. The method of claim 2, further comprising:

receiving, by the receiving device of the processing server, the primary account number from the first computing system prior to electronically transmitting the primary account number.

4. The method of claim 1, further comprising:

filtering, by a filtering module of the processing server, the plurality of data values to identify the one or more data values.

5. The method of claim 4, further comprising:

receiving, by the receiving device of the processing server, a data request from one of the one or more third computing system, wherein the data request includes one or more desired data types, and the filtering module is configured to filter the plurality of data values based on the one or more desired data types.

6. The method of claim 5, wherein the data request is received prior to electronic transmission of the digital token value to the second computing system.

7. The method of claim 6, wherein the data request further includes the account identifier included in the specific account profile.

8. The method of claim 1, further comprising:

identifying, by a determination module of the processing server, the subset of the identified plurality of merchants based on an increased matching correspondence level between the received plurality of data values and characteristics associated with each of the plurality of merchants based on past transactions involving the first user corresponding to the first user account that indicated via the plurality of data values.

9. The method of claim 8, wherein the past transactions involve at least one travel-related transaction involving the first user.

10. The method of claim 8, wherein the plurality of data values are accompanied by an indication of one or more of the conversational automated application programs.

11. A system for providing data values to an automated program, comprising:

an account database of a processing server associated with a social network configured to store a plurality of account profiles, wherein each account profile includes at least an account identifier related to a user account;

a receiving device of the processing server configured to receive, from a first computing system via a social network application program, a primary account number associated with a first user account related to a specific account profile;

a transmitting device of the processing server electronically configured to transmit the primary account number associated with a transaction account to a second computing system;

wherein the receiving device is further configured to receive, from the second computer system, a digital token value associated with the transaction account corresponding to the primary account number;

wherein the processing server is configured to update one of the stored account profiles associated with first user account with the received digital token value;

wherein the receiving device is further configured to receive, from the first computing system via the social network application program, a request for a service, the request including the primary account number associated with the first user account;

wherein the processing server is further configured to identify a plurality of merchants that offer a candidate service corresponding to the requested service and have a bot conversational automatic application program registered with the social network; and a querying module of the processing server configured to execute a query on the account database to identify the specific account profile related to the first user account;

wherein the transmitting device of the processing server is further configured to electronically transmit the digital token value included in the specific account profile to the second computing system;

wherein the receiving device of the processing server is further configured to receive from the second computing system a plurality of data values associated with a first user corresponding to the first user account related to the specific account profile based on the transmitted digital token value, wherein the processing server is further configured to identify a subset of the identified plurality of merchants based on an increased matching correspondence level between the received plurality of data values and characteristics associated with each of the plurality of merchants, wherein each merchant in the identified subset is respectively associated with a respective one of a subset of the bot conversational automatic application programs registered with the social network, and the transmitting device of the processing server is further configured to electronically transmit one or more data values of the plurality of data values to the subset of the bot conversational automatic application programs executing on one or more third computing systems, wherein the subset of the bot conversational automatic application programs provide one or more candidate services corresponding to the service requested by the first user via the social network application program.

12. The system of claim 11, wherein at least one of the plurality of data values includes transaction data associated with the transaction account.

13. The system of claim 12, wherein the receiving device of the processing server is further configured to receive the primary account number the first third computing system prior to electronically transmitting the primary account number.

14. The system of claim 11, further comprising:

a filtering module of the processing server configured to filter the plurality of data values to identify the one or more data values.

15. The system of claim 14, wherein the receiving device of the processing server is further configured to receive a data request from one of the one or more third computing systems, the data request includes one or more desired data types, and the filtering module is configured to filter the plurality of data values based on the one or more desired data types.

16. The system of claim 15, wherein the data request is received prior to electronic transmission of the digital token value to the first second computing system.

17. The system of claim 16, wherein the data request further includes the account identifier included in the specific account profile.

18. The system of claim 11, further comprising:
a determination module of the processing server configured to identify the subset of the identified plurality of merchants based on an increased matching correspondence level between the received plurality of data values and characteristics associated with each of the plurality of merchants based on past transactions involving the first user corresponding to the first user account that indicated via the plurality of data values.

19. The system of claim 18, wherein the transactions involve at least one travel-related transaction involving the first user.

20. The system of claim 18, wherein the plurality of data values are accompanied by an indication of one or more of the conversational automated application programs.

\* \* \* \* \*